United States Patent [19]

Maeno et al.

[11] Patent Number: 5,128,580
[45] Date of Patent: Jul. 7, 1992

[54] VIBRATION WAVE DRIVEN MOTOR

[75] Inventors: Takashi Maeno, Yokohama; Hiroyuki Seki, Urawa; Atsushi Kimura, Yokohama, all of Japan

[73] Assignee: Canon Kabushiki Kaisha, Tokyo, Japan

[21] Appl. No.: 679,288

[22] Filed: Apr. 2, 1991

[30] Foreign Application Priority Data

Apr. 2, 1990 [JP] Japan .................. 2-88083

[51] Int. Cl.$^5$ .......................... H01L 41/08
[52] U.S. Cl. ................................. 310/323
[58] Field of Search ................... 310/323, 328

[56] References Cited

U.S. PATENT DOCUMENTS

| | | | |
|---|---|---|---|
| 4,580,073 | 4/1986 | Okumura et al. | 310/323 |
| 4,672,256 | 6/1987 | Okuno et al. | 310/323 |
| 4,692,652 | 9/1987 | Seki et al. | 310/323 |
| 4,723,129 | 2/1988 | Endo et al. | 346/1.1 |
| 4,739,212 | 4/1988 | Imasaka et al. | 310/323 |
| 4,740,796 | 4/1988 | Endo et al. | 346/1.1 |
| 4,786,836 | 11/1988 | Tokushima | 310/323 |
| 4,978,882 | 12/1990 | Kitani | 310/323 |
| 5,041,750 | 8/1991 | Kitani | 310/323 |

FOREIGN PATENT DOCUMENTS

| | | |
|---|---|---|
| 3415628 | 10/1984 | Fed. Rep. of Germany . |
| 0169297 | 1/1986 | European Pat. Off. . |
| 62-077969 | 10/1987 | Japan . |
| 2174554A | 11/1986 | United Kingdom . |

Primary Examiner—Mark O. Budd
Attorney, Agent, or Firm—Fitzpatrick, Cella, Harper & Scinto

[57] ABSTRACT

In a vibration wave driven motor, an elastic body of an elliptic shape is provided where different degrees of stiffness or rigidity are available with the arcuate portions and the straight portions, and the ratio between the distortion energy and the vibration energy that part in the generation of the natural frequency for the A vibration mode is arranged virtually equal to that ratio for the B vibration mode, thus enabling the matching of frequencies for both A and B modes.

16 Claims, 9 Drawing Sheets

FIG. 3
FIG. 4
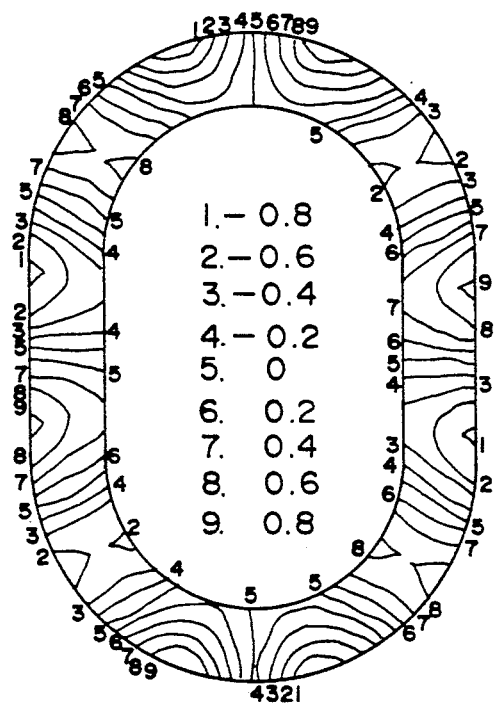
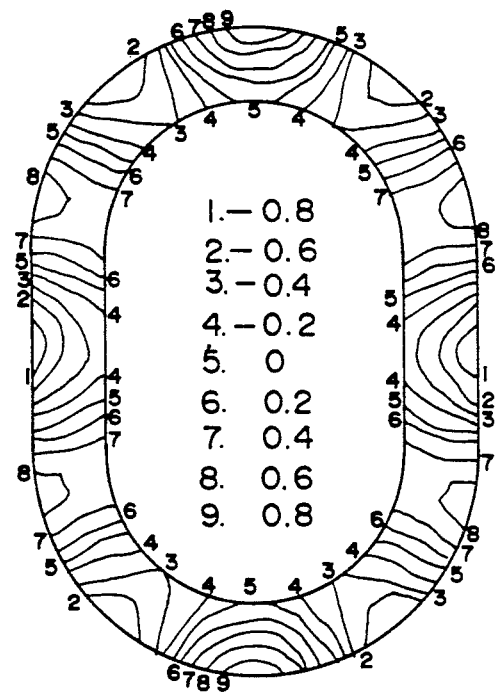

F I G. 5
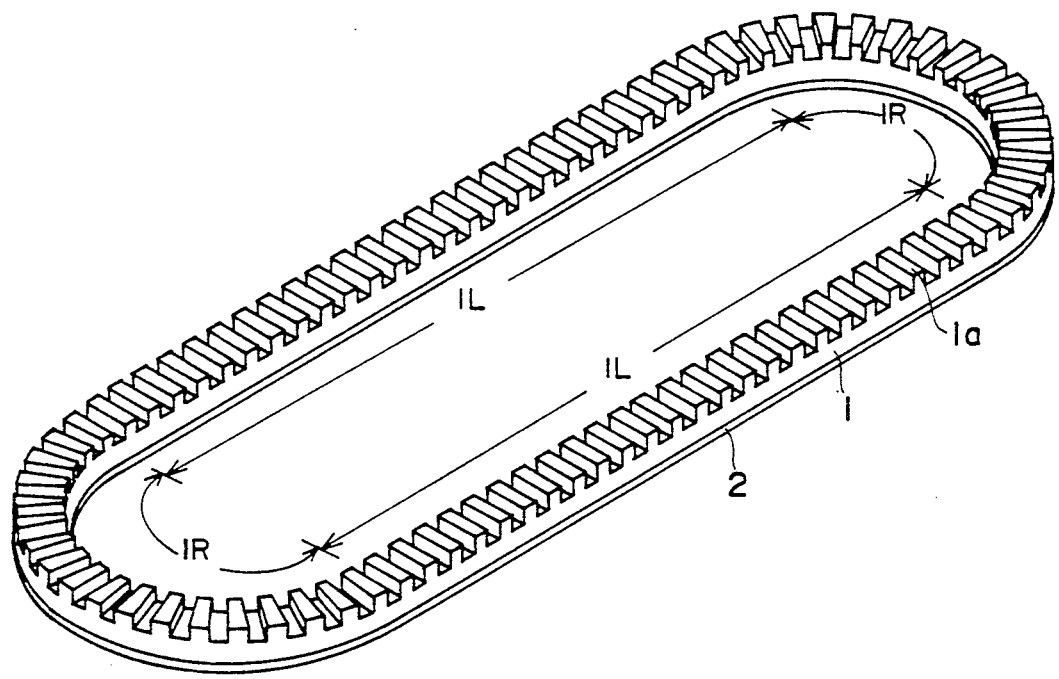

FIG. 6
FIG. 7
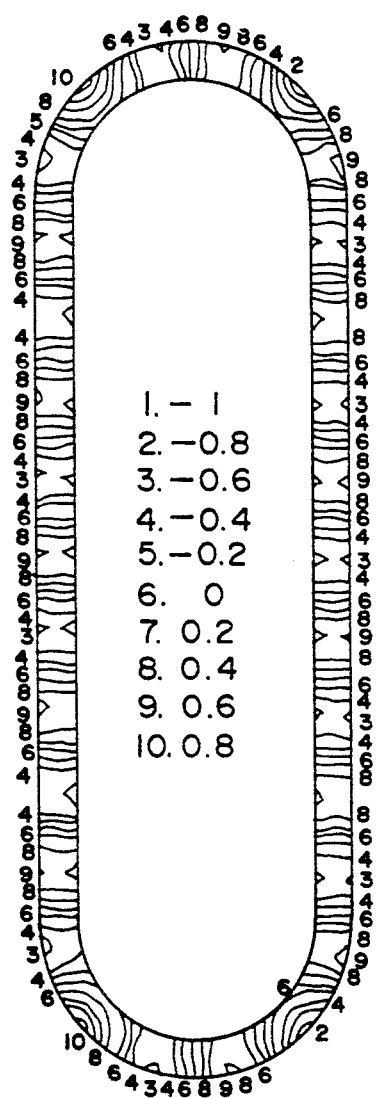
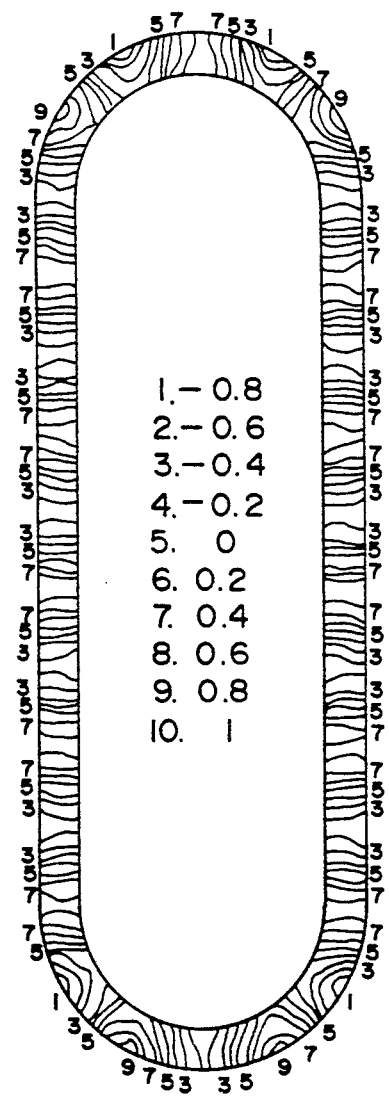

| | |
|---|---|
| 1 | −1.0 |
| 2 | −0.8 |
| 3 | −0.6 |
| 4 | −0.4 |
| 5 | −0.2 |
| 6 | 0 |
| 7 | 0.2 |
| 8 | 0.4 |
| 9 | 0.6 |
| 10 | 0.8 |
| 11 | 1.0 |

| | |
|---|---|
| 1 | −1.0 |
| 2 | −0.8 |
| 3 | −0.6 |
| 4 | −0.4 |
| 5 | −0.2 |
| 6 | 0 |
| 7 | 0.2 |
| 8 | 0.4 |
| 9 | 0.6 |
| 10 | 0.8 |
| 11 | 1.0 |

| | |
|---|---|
| 1 | −1.0 |
| 2 | −0.8 |
| 3 | −0.6 |
| 4 | −0.4 |
| 5 | −0.2 |
| 6 | 0 |
| 7 | 0.2 |
| 8 | 0.4 |
| 9 | 0.6 |
| 10 | 0.8 |
| 11 | 1.0 |

F I G. 15
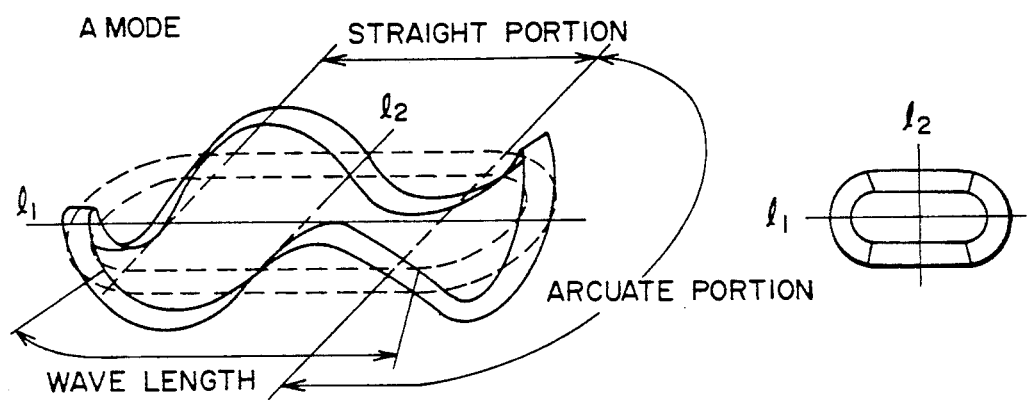
F I G. 16
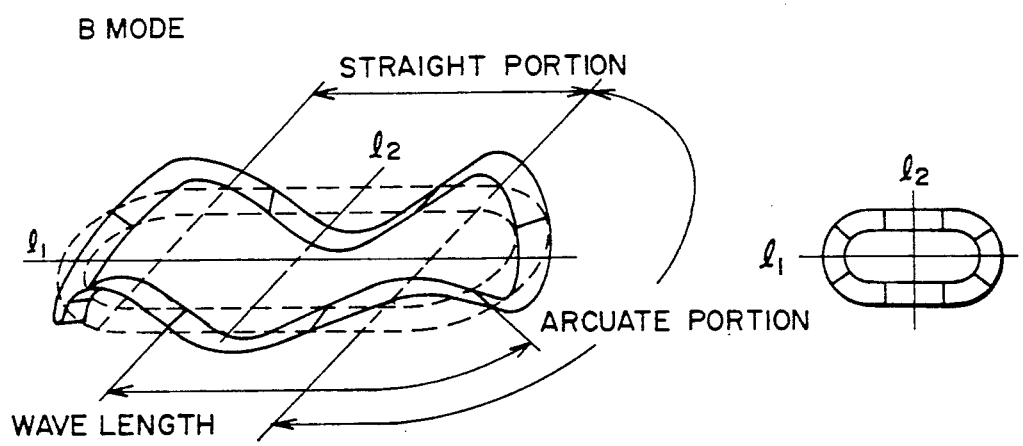

VIBRATION WAVE DRIVEN MOTOR

BACKGROUND OF THE INVENTION

1. Field of the Invention

This invention relates to a vibration wave driven motor wherein an elastic body, where travelling vibration waves are generated, is a running track type with an elliptic shape consisting of straight portions and arcuate portions.

2. Related Background Art

In a vibration wave driven motor that is driven by travelling vibration waves, a pair of standing waves are excited that have a positional phase shift of a multiple of $\lambda/4$ odd numbers, the same frequency, and a phase difference of $\pm\pi/2$ in time. Both waves thus excited are synthesized, thereby producing travelling vibration waves in the elastic body.

Accordingly, in order to constitute a vibration wave driven motor using travelling vibration waves, it is required that there exists a pair of vibration modes having a phase shift of standing waves by a multiple of $\lambda/4$ odd numbers as well as an equality, exact or approximate, in the natural frequencies of the vibration members in association with these two modes.

Such elastic bodies of a ring shape (a true circle form) as constituted in the embodiments of prior art have a symmetrical form of rotation, and a uniform shape of cross sections, whereby both the flexural rigidity and the torsional rigidity are equal at any point in these elastic bodies. As a result, the natural frequencies of the vibration member in association with the two modes mentioned above are always equal.

FIG. 5 is a perspective view illustrating a vibration member wherein a piezoelectric element 2 including an array of driving piezoelectric elements for exciting the pair of standing waves having the phase relationship mentioned above are glued and secured on the back of the elastic body 1 of an elliptic running track shape which consists of straight portions 1L and arcuate portions 1R. FIGS. 6 and 7 are the views illustrating the states of standing waves produced on the elastic body 1. Both FIGS. 6 and 7 use contour lines to show how the displacements occur in the elastic body plane in its vertical direction. The solid lines indicate the displacement [0], which forms a node of vibration (a nodal line). Each line number corresponds to its altitude: [10] denotes a maximum in the positive direction displacement (peak) while [1] denotes a minimum in the negative displacement (bottom).

In the case of this example, because of a high order travelling vibration mode as well as a larger diameter in the arcuate portion 1R, a degree of variance of both the flexural rigidity and the torsional rigidity at straight portions 1L and the arcuate portions 1R of the elastic body 1 becomes small, whereby a pair of vibration modes are recognized similar to the case of a ring type elastic body wherein the wavelength and amplitude of both the straight and arcuate portions can be considered approximately equal.

In the experiment, where the vibration member of a running track type having both a larger radius in the arcuate portion 1R of an elastic body and a larger wave number of the travelling vibration waves being generated was used, it was found that even if the length in both the straight portions 1L and the arcuate portions 1R are selected arbitrarily, a pair of vibrating waves with the phase shift of $\lambda/4$ and the equal natural frequencies can be generated. The ranges of the straight and arcuate portions are specified in FIG. 14.

A vibration member of a running track form, when excited, exhibits a pair of standing wave vibrating modes that are symmetrical to the $1_1$ axis and $1_2$ axis as shown in FIGS. 15 and 16. FIG. 15 shows the standing wave vibration mode that is produced by one array of the piezo electric elements. (This mode is called "A vibration mode" hereafter.) FIG. 16 shows another standing wave vibration mode that is produced by the other array of the piezo electric elements. (This mode is called "B vibration mode" hereafter.) The respective fourth order vibration waves are shown in FIG. 15 and FIG. 16.

As the radius of the arcuate portion becomes smaller, the differences in the flexural rigidity, the torsional rigidity and the inertial mass become greater between the straight and arcuate portions. This results from the fact that the inside length is equal to the outside length at the straight portions, while the length of thinner circumference is not equal to that of the outer circumference for the arcuate portion.

Furthermore, since the positions of the antionodes and nodes for the A vibration mode are different from those of the antinodes and nodes for the B vibration mode, a degree of contributions to each mode by the rigidity of both the straight portion and the arcuate portion of the elastic body is subject to variations, whereby a pair of vibration modes are produced that have different wavelengths, amplitudes and torsional amounts. In this case, the natural frequencies of these two modes generally do not match. Especially when the vibration is low order, the wavelength becomes relatively long and one wave in the wavelength of vibrating waves spreads wide over both the straight and arcuate portions, thus causing the natural frequencies of each vibration mode to become further apart. In the case of the example shown in FIGS. 8 and 9, the radius is 3 mm and the outside diameter is 7 mm for the arcuate portion. The length is 20 mm and the width is 4 mm for the straight portion. The thickness is 2 mm for the vibrator made of stainless steel (SUS). The natural frequencies in this case are 153 KHz in FIG. 8, and 136 KHz in FIG. 9.

As suggested by the case described above, it is difficult to derive the equality in the natural frequencies between A and B vibration mode from the vibrator of running track type having both a small radius in the arcuate portions and a low order vibration.

SUMMARY OF THE INVENTION

One aspect of this invention is to provide a vibration wave driven motor of an elliptic form wherein the generation of travelling vibration waves can be assured even in a small radius at the arcuate portions.

Another aspect of this invention is to provide a vibration wave driven motor of an elliptic form that allows low order travelling vibration waves to be set at discretion.

One aspect of this invention relates to its feature that with the elastic body of an elliptic shape where different degrees of stiffness or rigidity are available with the arcuate portions and the straight portions, the ratio between the strain energy and the vibration energy that part in the generation of the natural frequency for the A vibration mode is virtually matched to that ratio for the B vibration mode, thus enabling the matching of frequencies for both A and B modes.

As an embodiment of the present invention, the natural frequency is assumed to be "f";

$$f = \frac{1}{2\pi} \sqrt{\frac{\int_0^l EI\left(\frac{\partial^2 y}{\partial x^2}\right)^2 dx}{\int_0^l \rho A y^2 dx}} = \frac{1}{2\pi} \sqrt{\frac{K}{M}}$$

E: modulus of longitudinal elasticity
I: moment of inertia of area
ρ: density A: cross section area
x: a position in the direction of length
y displacement in the direction of off plane vibration
M: generalized mass (equivalent mass in the system with one degree of freedom)
K: generalized stiffness (equivalent rigidity in the system with one degree of freedom) In the conditions established as described above, the M and the K were matched.

Thus the ratios defined below in each A vibration mode and B vibration mode are made equal.

$$\frac{\text{strain energy sum (the above-mentioned } K)}{\text{square sum of vibrating amplitude (the above-mentioned } M)}$$

More practically, the contributions ratios of the strain energy and the kinetic energy are made equal to either the straight portion and arcuate portion in the elastic member of the elliptical shape.

A feature of another embodiment of this invention is that the shape was arranged so as to match both values of K/M, which represents an amount proportional to the value obtained by dividing the strain energy sum by the square sum of vibrating amplitude.

Still other objects of this invention will become apparent in the course of the detailed explanations to be given hereinbelow.

BRIEF DESCRIPTION OF THE DRAWINGS

FIGS. 1A through 4 show the first embodiment of a vibration wave driven motor of this invention. FIG. 1A is a cross sectional view, and 1B is a top view. FIG. 2 is a perspective view of the elastic body which is shown in FIGS. 1A and 1B. FIGS. 3 and 4 are drawings illustrating the displacement of the elastic body which is shown in FIGS. 1A and 1B. FIG. 5 is a perspective view of the elastic body which has a large radius in the arcuate portions. FIGS. 6 and 7 are drawings illustrating the displacement of the elastic body which is shown in FIG. 5. FIGS. 15 and 16 are conceptual drawings illustrating the vibration states of the elastic body in the vibration modes of four waves.

DESCRIPTION OF THE PREFERRED EMBODIMENTS

Embodiment 1.

FIGS. 1A through 4 show one embodiment wherein a vibration wave driven motor of this invention is used as a driving source in a printer of the bubble jet type.

Such a printer using a bubble jet method as mentioned above is outlined in U.S. Pat. No. 4,723,129 and 4,740,796 and is described briefly as follows:

At least one driving signal, capable of producing a sharp temperature increase in excess of nuclear boiling and also matching one piece of recording information is impressed on each electro-thermal transducer placed pairing with a sheet and a liquid path wherein liquid (ink) is stored. This signal creates thermal energy over the electro-thermal transducer and produces thin film boiling on the heat acting surface of a recording head, thereby producing one bubble to one driving signal inside the liquid (ink). The growth and shrinkage of this air bubble emits the liquid (ink) from a discharge opening, whereby at least one droplet is created. Such droplets sprayed over a sheet of paper create a character. The printer employing this method is generally called a bubble jet printer.

Figure 1A:
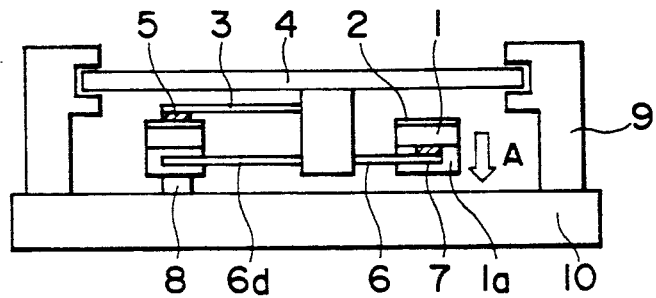
Figure 1B:
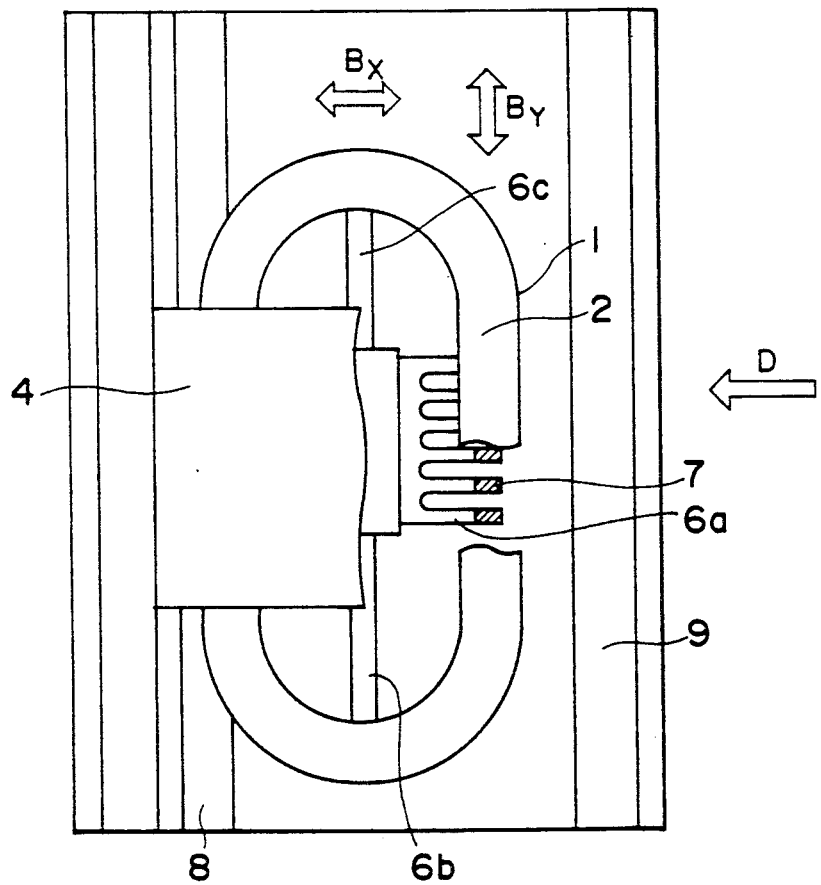
Figure 2:
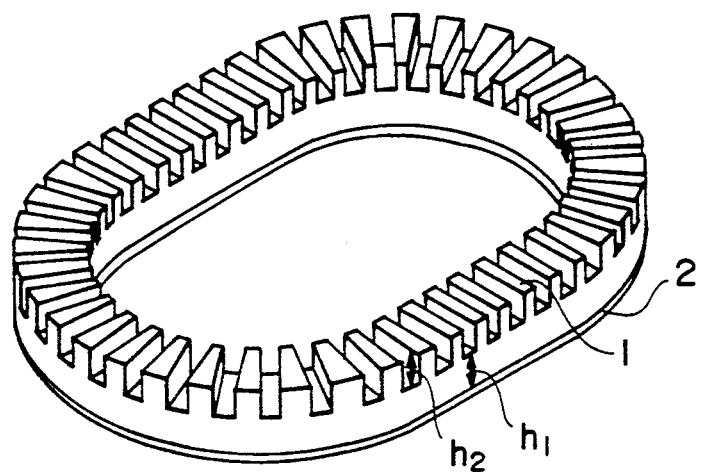

FIGS. 1A and 1B are examples where a linear vibration wave driven motor is used as a vibration wave driven motor. The elastic body 1 of an elliptic shape shown in FIG. 2 is used as a movable member.

Figure 10:
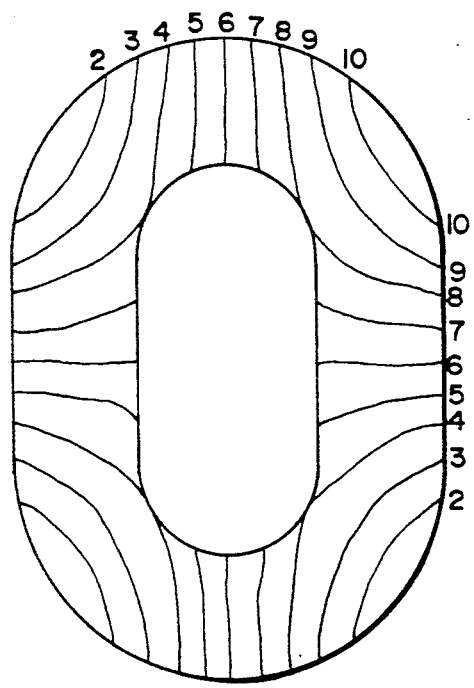
FIGS. 10 and 11 are drawings illustrating the displacement of the elastic body in the second embodiment.

In FIGS. 1A and 1B, 10 is a base plate that is secured to the printer's member (which is not shown in the Figure). Numeral 9 are guide members that are set on both sides of the base plate 10 and have guide grooves of U shape. Numeral 8 is a stator fixed to the base plate 10 to form a rail. Numeral 4 is a movable member that is supported movably between the guide members 9, and fixed to an elastic body 1 via a supporting plate 6 (which will be explained later) such that it can be moved by said elastic body 7. On the movable member 4, a head is established at the right end of the same member 4 in order to print characters on a cut sheet (which is not shown in the Figure). The cut sheet, by the way, is transported by mean of a different driving source through the opening between the abovementioned printer member and base plate 10 in the direction perpendicular to the moving direction of elastic body 1. Numeral 6 is an elastic supporting plate that is coupled to the elastic body 1 by means of slit portions 6a, 6d, and engaging portions 6c, 6b in such a manner that the movement of the elastic body 1 (an elastic supporting plate) is restricted in both the Bx and Br directions. The elastic body 1 is pressed to stator 8 with a predetermined force of press contact that is generated by the elastic force of the elastic supporting plate 6 in the direction A indicated by the arrow When an array of driving elements of the piezo electric elements 2 secured to elastic body 1 is applied with an AC voltage having a predetermined phase difference, standing waves as illustrated in FIGS. 3 and 4 are produced on the elastic body. As those waves are synthesized, travelling vibration waves are generated. Thus, the elastic member is moved straight along the stator 8 while maintaining a frictional contact with stator 8.

Each natural frequency f of the elastic body 1 in both A and B vibration in FIGS. 3 and 4 was f (KHz)=70.47 and 70.48, which are almost identical as shown in the chart below.

The sizes of the elastic body 1 (cf. FIG. 2) comprising the vibrating body are: the length of the straight portion 10.9 mm, the inner diameter of the arcuate portion 8.5 mm, the outside diameter 12.5 mm, the width 4 mm, and the thickness $h_1 = 2.5$ mm for the base part and $h_2 = 1.5$ mm for the tooth part.

TABLE

|  | A vibration mode | B vibration mode |
|---|---|---|
| M(kg) | $2.289 \times 10^{-3}$ | $2.121 \times 10^{-3}$ |
| K(N/m) | $4.488 \times 10^{11}$ | $4.159 \times 10^{8}$ |
| $\frac{K}{M}$ (1/sec) | $1.961 \times 10^{11}$ | $1.961 \times 10^{11}$ |
| f(KHz) | 70.47 | 70.48 |

The elastic body 1 of the present embodiment having characteristics described above produces standing waves of sixth order with small distortion in the straight portion, which is a driving portion. Also each natural frequency of the vibrating bodies becomes approximately equal in association with the two vibration modes with a positional phase shift of ¼ wavelength.

Accordingly, whenever the piezo electric elements 2 as the electrical-mechanical converting member are excited, the generation of the travelling vibration waves in the vibrating bodies 1 and 2 can be assured.

Embodiment 2

Figure 11:
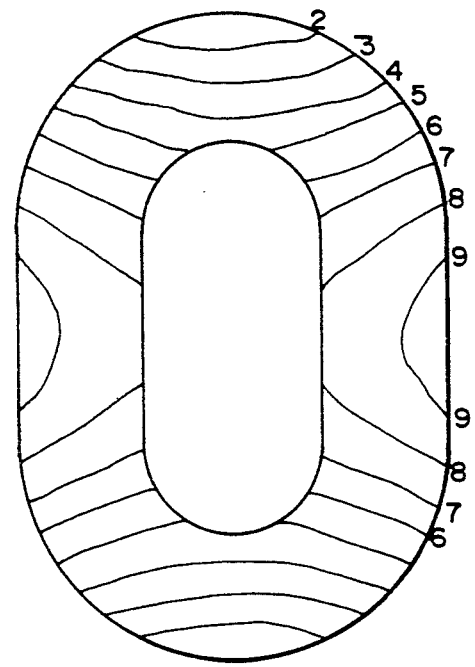

FIGS. 10 and 11 show a second embodiment.

The natural frequencies $f_A$, $f_B$ in both A and B vibration modes of this embodiment are obtained as follows based on the equation previously explained:

$$f_A = \frac{1}{2\pi} \sqrt{\frac{K}{M}} = 23.44 \text{ KHz}$$

$$f_B = \frac{1}{2\pi} \sqrt{\frac{K}{M}} = 23.42 \text{ KHz}$$

Figure 8:
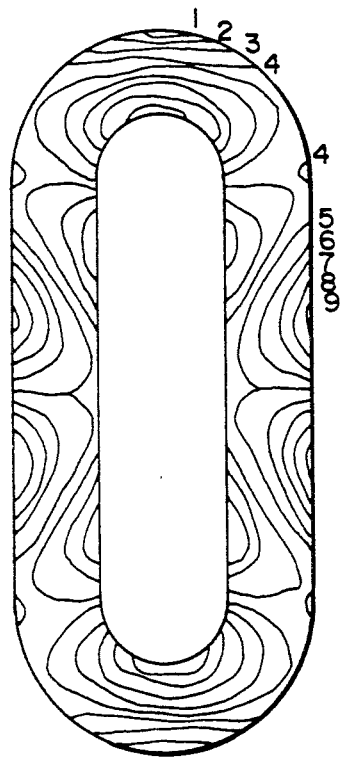
FIGS. 8 and 9 are drawings illustrating the displacement of the elastic body of a conventional vibration wave driven motor.
Figure 9:
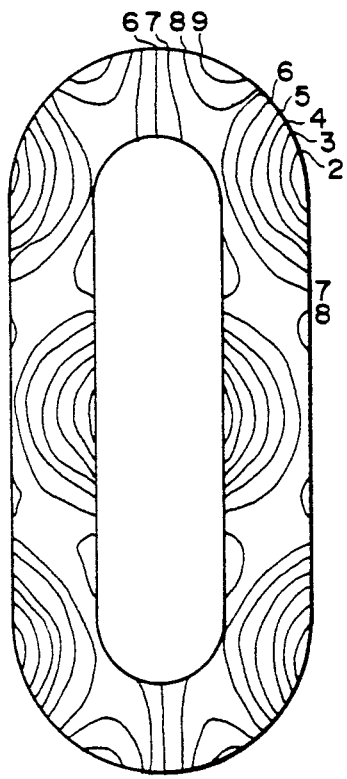

The sizes of the elastic member are the same as the case in FIGS. 8 and 9 except that the length of the elastic body in the straight portion is 7 mm. The number of the wave in the arcuate portion is small, namely 0.6.

Though different shapes of vibration modes are observed in the present embodiment as shown in FIGS. 10 and 11, each natural frequency of the vibration members for each vibration mode is substantially the same, thus generating travelling vibration waves over the vibration members.

Embodiment 3

Figure 12:
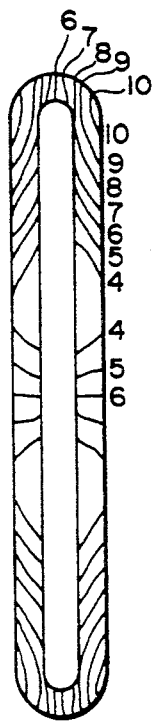
FIGS. 12 and 13 are drawings showing the displacement of the elastic body in the third embodiment.
Figure 13:
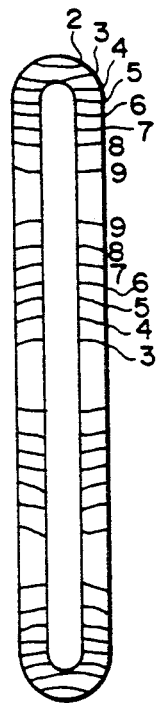
Figure 14:
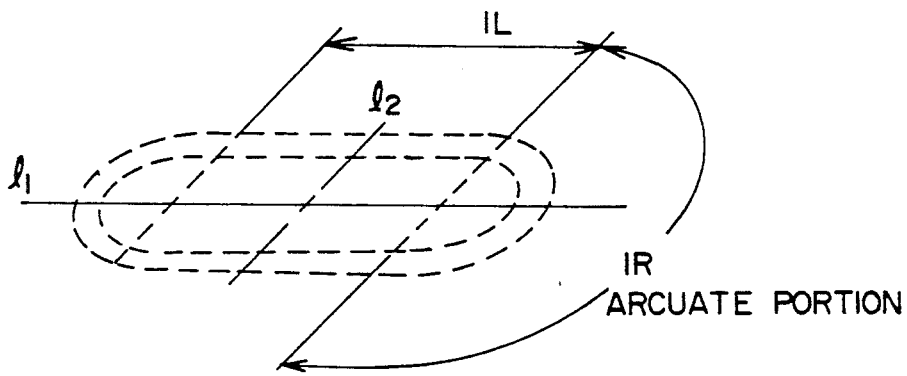
FIG. 14 is a drawing showing straight portions and arcuate portions of the elastic body.

FIGS. 12 and 13 show the third embodiment.

The natural frequencies $f_A$, $f_B$ in both A and B vibration modes of this embodiment are obtained as follows based on the equation previously explained:

$$f_A = \frac{1}{2\pi} \sqrt{\frac{K}{M}} = 5.67 \text{ KHz}$$

$$f_B = \frac{1}{2\pi} \sqrt{\frac{K}{M}} = 5.69 \text{ KHz}$$

The sizes of the elastic member are the same as the case in FIGS. 8 and 9 except that the length of the elastic body in the straight portion is 87 mm. The number of the wave in the arcuate portion is small, namely 0.4.

With the vibration wave driven motor of this invention, as hitherto described in detail, of the elastic body consisting of straight portions and arcuate portions, the following effects can be realized because virtual matching is achieved of the ratios K/M in association with each of A and B vibration modes and, as a result of this, the natural frequencies in relation to each vibration mode also become virtually equal.

1. Arbitrary order of travelling vibration waves can be selected in a vibration wave driven motor.

2. The length of the straight portion of a vibration member can be defined if the radius of the arcuate portion of a vibration member is determined. Reversely, the radius of the arcuate portion can be defined if the length of the straight portion is determined.

3. It becomes feasible to make a vibration wave driven motor that has the vibration order less than third mode. Thus, it is possible to make a compact motor with reduction of extra space (the arcuate portions, etc.) except the driving portion (one of the straight portions).

In the embodiments hitherto described, it is assumed that the vibration members 1 and 2 move over the stator 8. This invention, however, is also applicable to an apparatus where the vibrating members 1 and 2 are fixedly arranged at a predetermined position and a transporting member such as a sheet is placed over the vibrating members so that the transporting means can be transferred by the travelling vibration waves.

We claim:

1. A vibration wave driven motor comprising:
 a vibration member of a loop shape consisting of straight portions and arcuate portions that are extended from said straight portions, said vibration member generating a travelling vibration wave circulating in the vibration member in response to at least first and second standing waves which are produced by an applied electrical signal, wherein a ratio between strain energy and vibrating energy in said vibration member in relation to the first standing wave is substantially equal to a ratio between strain energy and vibrating energy in said vibration member in relation to the second standing wave.

2. A vibration wave driven motor according to claim 1, wherein said vibration member consists of a pair of straight portions and a pair of arcuate portions respectively extending from each end of said pair of straight portions, said vibration member having a predetermined width and a predetermined thickness.

3. A vibration wave driven motor according to claim 1, wherein a ratio of the length of the straight portions and the length of the arcuate portions is selected in such a manner that said strain energy to vibration energy ratios are substantially equal.

4. A vibration wave driven motor according to claim 2, wherein each length of said pair of straight portions is 10.9 mm, each radius of said pair of arcuate portions is 8.5 mm, the outside diameter is 12.5 mm, the width is 4 mm, and the thickness is 4 mm.

5. A vibration wave driven motor according to claim 4, wherein said vibration member has a contact surface that contacts a contact member.

6. A vibration wave driven motor according to claim 5, wherein the contact surface of said vibration member has a plurality of grooves.

7. A vibration wave driven motor according to claim 6, wherein the depth of said grooves is 1.5 mm.

8. A vibration wave driven motor comprising:

a vibration member of a loop shape that has a pair of straight portions, each of which has a predetermined length, and a pair of arcuate portions, each having a predetermined length, each end of said arcuate portions extending from a respective end of said straight portions; and a pair of electro-mechanical energy converting elements that contacts said vibration member and generates first and second standing waves in said vibration member in response to an applied electrical signal, the lengths of the straight and arcuate portions of said vibration member being selected such that a ratio between the strain energy sum and the square sum of the vibrating amplitude in said vibration member in association with said first standing wave is substantially equal to a ratio between the strain energy sum and the square sum of the vibrating amplitude in said vibration member in association with the second standing wave.

9. A vibration wave driven motor according to claim 8, wherein the length of each straight portion is 10.9 mm, the radius of each arcuate portion is 8.5 mm, the outside diameter is 12.5 mm, the width is 4 mm, and the thickness is 4 mm for said vibration member.

10. A vibration wave driven motor according to claim 8, wherein said vibration member has a contact surface that contacts a contact member.

11. A vibration wave driven motor according to claim 10, wherein the contact surface of said vibration member has a plurality of grooves.

12. A vibration wave driven motor according to claim 11, wherein the depth of said grooves is 1.5 mm.

13. A vibration wave driven motor comprising:

a vibration member of a loop shape that has a pair of straight portions, each of which has a predetermined length, and a pair of arcuate portions, each having a predetermined length, each end of said arcuate portions extending from a respective end of said straight portions; and a pair of electro-mechanical energy converting elements provided on said vibration member with a positional phase difference therebetween for generating first and second standing waves in said vibration member in response to respective applied electrical signals having an electrical phase difference therebetween, the lengths of the straight and arcuate portions of said vibration member being selected such that a ratio between the strain energy sum and the square sum of the vibration amplitude in said vibration member in association with said first standing wave is substantially equal to a ratio between the strain energy sum and the square sum of the vibrating amplitude in said vibration member in association with said second standing wave.

14. A vibration wave driven printer comprising:

a contact member;

a movable body of an elliptic shape that movably contacts said contact member;

a printing head functionally engaged with said movable body; and a pair of electro mechanical energy converting elements contacting said movable member and generating first and second standing waves in said movable member in response to an applied electrical signal, the lengths of the straight and arcuate portions of said movable member being selected such that a ratio between the strain energy sum and the square sum of the vibrating amplitude in said movable member in association with said first standing wave is substantially equal to a ratio between the strain energy sum and the square sum of the vibrating amplitude in said movable member in association with said second standing wave.

15. A vibration wave driven printer according to claim 14, wherein said printer is a bubble jet type printer.

16. A vibration device for a vibration wave driven motor, the device comprising:

a contact member;

a vibration member contacting said contact member and comprising a pair of straight portions, each of which has a predetermined length, and a pair of arcuate portions, each having a predetermined length, each of said arcuate portions extending from a respective end of said straight portions;

a pair of electro-mechanical energy converting elements contacting said vibration member, for generating first and second standing waves in said vibration member in response to an applied electrical signal, the lengths of the straight and the arcuate portions of said vibrating member being selected such that a ratio between the strain energy sum and the square sum of vibrating amplitude in association with said first standing wave is substantially equal to a ratio between the strain energy sum and the square sum of the vibrating width in said vibration member in association with said second standing wave.

* * * * *